United States Patent
Morita

(10) Patent No.: US 11,823,843 B2
(45) Date of Patent: Nov. 21, 2023

(54) CERAMIC ELECTRONIC DEVICE WITH A CERAMIC PROTECTION SECTION HAVING A COVER LAYER AND A SIDE MARGIN, AND MANUFACTURING METHOD OF THE SAME

(71) Applicant: TAIYO YUDEN CO., LTD., Tokyo (JP)

(72) Inventor: Koichiro Morita, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 36 days.

(21) Appl. No.: 17/034,915

(22) Filed: Sep. 28, 2020

(65) Prior Publication Data

US 2021/0118617 A1 Apr. 22, 2021

(30) Foreign Application Priority Data

Oct. 17, 2019 (JP) ................. 2019-190493

(51) Int. Cl.
*H01G 4/30* (2006.01)
*H01G 4/008* (2006.01)
(Continued)

(52) U.S. Cl.
CPC ........... *H01G 4/30* (2013.01); *C04B 35/4682* (2013.01); *C04B 35/64* (2013.01); *H01G 4/008* (2013.01);
(Continued)

(58) Field of Classification Search
CPC .......... H01G 4/30; H01G 4/008; H01G 4/012; H01G 4/1227; H01G 4/224; H01G 4/1245;
(Continued)

(56) References Cited

U.S. PATENT DOCUMENTS

| 6,043,974 A | * | 3/2000 | Chen | ...................... C04B 35/49 |
| | | | | 361/321.2 |
| 9,275,797 B2 | * | 3/2016 | Suzuki | ................. H01G 4/1236 |

(Continued)

FOREIGN PATENT DOCUMENTS

| JP | 2005-268712 A | 9/2005 |
| JP | 2007-110148 A | 4/2007 |

(Continued)

OTHER PUBLICATIONS

Anton V. Polotai et al., "Utilization of Multiple-Stage Sintering to Control Ni Electrode Continuity in Ultrathin Ni—BaTiO3 Multilayer Capacitors", 2007, pp. 3811-3817.
Notice of Reasons for Refusal dated Sep. 26, 2023 in a counterpart Japanese Application No. 2019-190493.

*Primary Examiner* — David M Sinclair
*Assistant Examiner* — Daniel M Dubuisson
(74) *Attorney, Agent, or Firm* — Stein IP, LLC

(57) ABSTRACT

A multilayer ceramic capacitor includes: a multilayer structure in which each of a plurality of dielectric layers and each of a plurality of internal electrode layers are alternately stacked. A ceramic protection section includes a cover layer and a side margin. A main component ceramic of the ceramic protection section is a ceramic material having a perovskite structure expressed as a general formula $ABO_3$. An A site of the perovskite structure includes at least Ba. A B site of the perovskite structure includes at least Ti and Zr. A Zr/Ti ratio which is a molar ratio of Zr and Ti is 0.010 or more and 0.25 or less. An A/B ratio which is a molar ratio of the A site and the B site is 0.990 or less.

10 Claims, 11 Drawing Sheets

(51) Int. Cl.
*H01G 4/012* (2006.01)
*H01G 4/224* (2006.01)
*C04B 35/64* (2006.01)
*H01G 4/12* (2006.01)
*C04B 35/468* (2006.01)

(52) U.S. Cl.
CPC ........... *H01G 4/012* (2013.01); *H01G 4/1227* (2013.01); *H01G 4/224* (2013.01)

(58) Field of Classification Search
CPC .... H01G 4/0085; H01G 4/1236; H01G 4/232; C04B 35/4682; C04B 35/64; C04B 2235/3215; C04B 2235/3244; C04B 2235/6562; C04B 2235/6584; C04B 2235/768; C04B 2235/786; C04B 2235/79; C04B 2235/96; C04B 2237/346; C04B 2237/588; C04B 2237/704; C04B 2237/80; C04B 35/49; B32B 18/00

See application file for complete search history.

(56) References Cited

U.S. PATENT DOCUMENTS

| | | | |
|---|---|---|---|
| 11,289,272 B2 * | 3/2022 | Iguchi | H01G 4/1227 |
| 2016/0027587 A1 * | 1/2016 | Furukawa | C23C 18/1225 |
| | | | 428/697 |
| 2016/0268045 A1 | 9/2016 | Kaneko et al. | H01G 4/1227 |
| 2016/0293333 A1 | 10/2016 | Kaneko et al. | H01G 4/30 |
| 2018/0218840 A1 * | 8/2018 | Watabe | H01G 4/30 |
| 2019/0237255 A1 * | 8/2019 | Sakurai | C04B 35/49 |

FOREIGN PATENT DOCUMENTS

| | | | |
|---|---|---|---|
| JP | 2009035431 A * | 2/2009 | H01G 4/1227 |
| JP | 2016-169130 A | 9/2016 | |
| JP | 2016-195144 A | 11/2016 | |
| JP | 2018-170527 A | 11/2018 | |
| JP | 2019-176176 A | 10/2019 | |

* cited by examiner

CERAMIC ELECTRONIC DEVICE WITH A CERAMIC PROTECTION SECTION HAVING A COVER LAYER AND A SIDE MARGIN, AND MANUFACTURING METHOD OF THE SAME

CROSS-REFERENCE TO RELATED APPLICATION

This application is based upon and claims the benefit of priority of the prior Japanese Patent Application No. 2019-190493, filed on Oct. 17, 2019, the entire contents of which are incorporated herein by reference.

FIELD

A certain aspect of the present invention relates to a ceramic electronic device and a manufacturing method of the ceramic electronic device.

BACKGROUND

There is known a ceramic electronic device such as a multilayer ceramic capacitor in which each of internal electrode layers and each of dielectric layers are alternately stacked. There is disclosed a technology in which a continuous modulus of internal electrode layers is improved by increasing a temperature increasing speed to 3000 degrees C./h when the ceramic electronic device is made by firing (for example, see "J. Am. Ceram. Soc., 90 [12] 3811-3817 (2007)".

SUMMARY OF THE INVENTION

The present inventors have found that the continuity of the internal electrode layers is improved even if the temperature increasing speed is further increased. However, when the temperature increasing speed is high, a ceramic protection section for protecting the internal electrode layers is not sufficiently sintered. When the ceramic protection section is not sufficiently sintered, hardness of a surface of the ceramic electronic device is not sufficiently large and a breaking may occur. When a crack caused by the breaking reaches the internal electrode layers through the ceramic protection section, an electrical short may occur. However, the internal electrode layers may be excessively sintered, when the temperature increasing speed is reduced or the firing temperature is increased in order to sufficiently sinter the ceramic protection section.

The present invention has a purpose of providing a ceramic electronic device and a manufacturing method of the ceramic electronic device that are capable of securing sufficient mechanical hardness of the ceramic protection section even if a temperature increasing speed of the firing is high.

According to an aspect of the present invention, there is provided a ceramic electronic device including a multilayer structure in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first end face and a second end face of the multilayer structure, the first end face facing with the second end face, wherein a ceramic protection section includes a cover layer and a side margin, wherein the cover layer is provided on at least one of an upper face and a lower face in a stacking direction of the multilayer structure, wherein, in the multilayer structure, the side margin is a section covering edge portions to which the plurality of internal electrode layers extend toward two side faces other than the first end face and the second end face, wherein a main component ceramic of the ceramic protection section is a ceramic material having a perovskite structure expressed as a general formula $ABO_3$, herein an A site of the perovskite structure includes at least Ba, wherein a B site of the perovskite structure includes at least Ti and Zr, wherein a Zr/Ti ratio which is a molar ratio of Zr and Ti is 0.010 or more and 0.25 or less, wherein an A/B ratio which is a molar ratio of the A site and the B site is 0.990 or less.

According to another aspect of the present invention, there is provided a manufacturing method of a ceramic electronic device including: preparing a ceramic multilayer structure including a multilayer portion, a cover sheet and a side margin section; firing the ceramic multilayer structure, wherein, in the multilayer portion, each of a plurality of sheets including particles of which a main component is ceramic and each of plurality of metal conductive paste patterns are alternately stacked, the plurality of metal conductive paste patterns being alternately exposed to a first end face and a second end face of the ceramic multilayer structure, the first end face facing with the second end face, wherein the cover sheet is provided on at least one of an upper face and a lower face in a stacking direction of the multilayer portion, wherein the side margin section is provided on a side face of the multilayer portion, wherein a main component ceramic of the cover sheet before the firing and the side margin section before the firing is a ceramic material having a perovskite structure expressed as a general formula $ABO_3$, wherein an A site of the perovskite structure includes at least Ba, wherein a B site of the perovskite structure includes at least Ti and Zr, wherein a Zr/Ti ratio which is a molar ratio of Zr and Ti is 0.010 or more and 0.25 or less, wherein an A/B ratio which is a molar ratio of the A site and the B site is 0.990 or less.

DETAILED DESCRIPTION

A description will be given of an embodiment with reference to the accompanying drawings.

Embodiment

Figure 1:
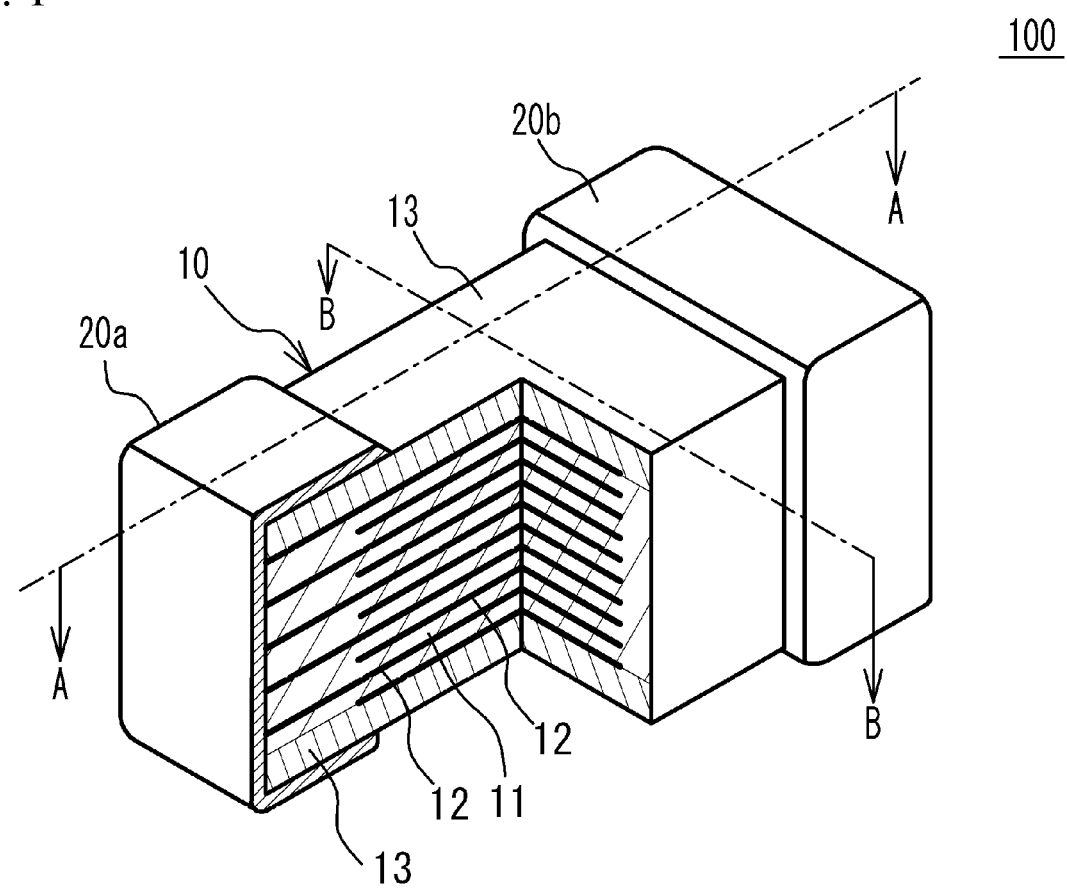
FIG. 1 illustrates a partial perspective view of a multilayer ceramic capacitor.
Figure 2:
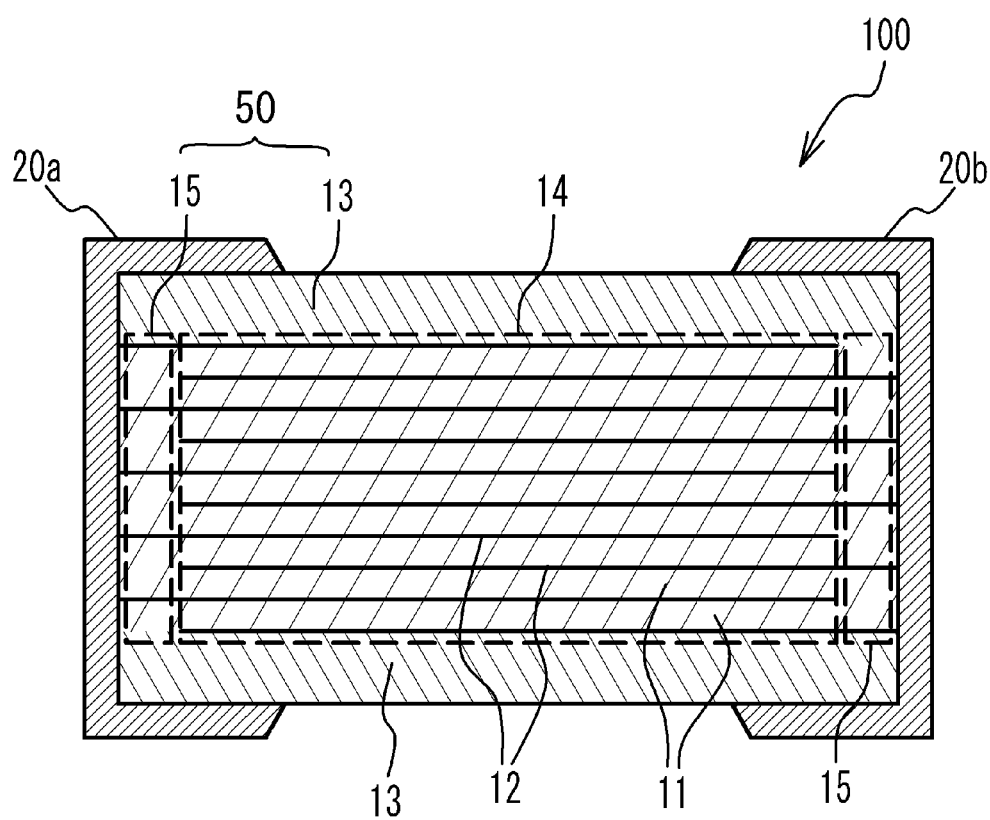
FIG. 2 illustrates a cross sectional view taken along a line A-A of FIG. 1.
Figure 3:
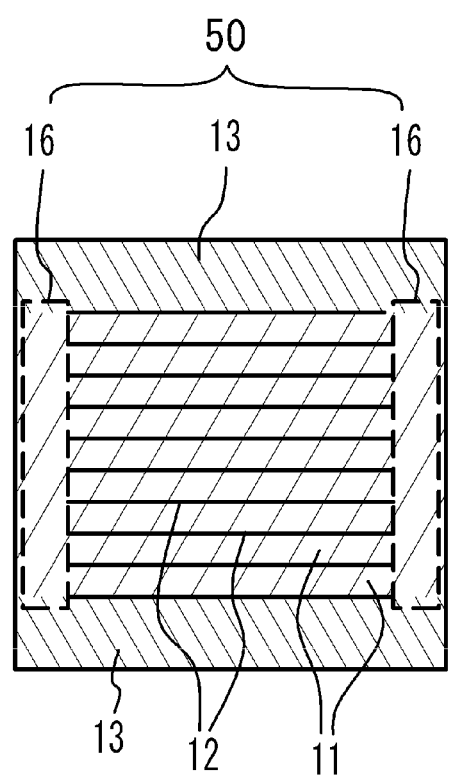
FIG. 3 illustrates a cross sectional view taken along a line B-B of FIG. 1.

FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. Two faces other than an upper face and a lower face in a stacking direction among four faces other than the two end faces are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal. End edges of the internal electrode layers 12 are alternately exposed to a first end face of the multilayer chip 10 and a second end face of the multilayer chip 10 that is different from the first end face. In the embodiment, the first face faces with the second face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer structure of the dielectric layers 11 and the internal electrode layers 12, outermost layers are two of the internal electrode layers 12. An upper face and a lower face in the stack direction of the multilayer structure are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of noble metal such as platinum (Pt), palladium (Pd), silver (Ag), gold (Au) or alloy thereof. An average thickness of the internal electrode layers 12 is, for example, 1 μm or less. The dielectric layers 11 are mainly composed of a ceramic material having a perovskite structure expressed by a general formula $ABO_3$. The perovskite structure includes $ABO_{3-\alpha}$ having an off-stoichiometric composition. In the embodiment, an A site of the ceramic material includes at least Ba (barium), and a B site of the ceramic material includes at least Ti (titanium).

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. And so, the section is referred to as a capacity section 14. That is, the capacity section 14 is a section in which the internal electrode layers 12 next to each other are connected to different external electrodes face each other.

A section, in which the internal electrode layers 12 connected to the external electrode 20a face with each other without sandwiching the internal electrode layer 12 connected to the external electrode 20b, is referred to as an end margin 15. A section, in which the internal electrode layers 12 connected to the external electrode 20b face with each other without sandwiching the internal electrode layer 12 connected to the external electrode 20a is another end margin 15. That is, the end margin 15 is a section in which a set of the internal electrode layers 12 connected to one external electrode face with each other without sandwiching the internal electrode layer 12 connected to the other external electrode. The end margin 15 is a section that does not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces.

The cover layers 13 and the side margins 15 surround the external circumference of the capacity section 14 and thereby protect the capacity section 14. And so, in the following, the cover layers 13 and the side margins 16 are referred to as a ceramic protection section 50.

Figure 4A:
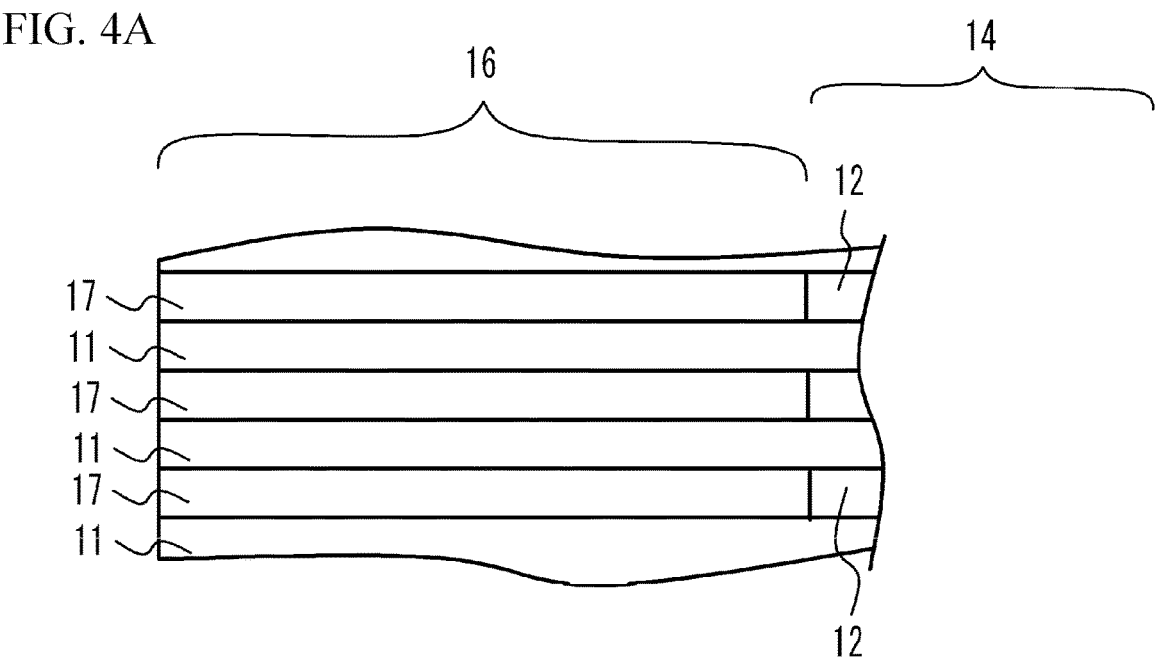
FIG. 4A illustrates an enlarged view of a cross section of a side margin.

FIG. 4A illustrates an enlarged view of the cross section of the side margin 16. The side margin 16 has a structure in which the dielectric layer 11 and a reverse pattern layer 17 are alternately stacked in a stacking direction of the dielectric layer 11 and the internal electrode layer 12 in the capacity section 14. Each of the dielectric layers 11 of the capacity section 14 are continuously formed with each of the dielectric layers 11 of the side margin 16. With the structure, a level difference between the capacity section 14 and the side margin 16 is suppressed.

Figure 4B:
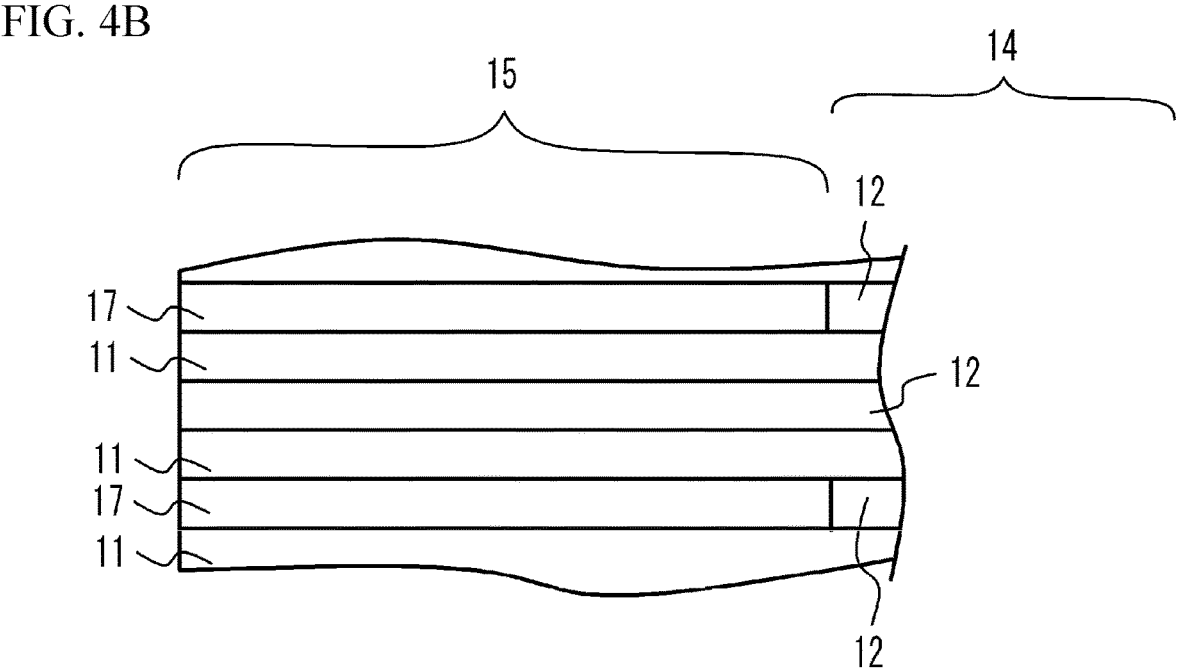
FIG. 4B illustrates an enlarged view of a cross section of an end margin.

FIG. 4B illustrates an enlarged view of the cross section of the end margin 15. Compared to the side margin 16, in the end margin 15, every other layer, the internal electrode layers 12 extends to the edge face of the end margin 15. The reverse pattern layer 17 is not provided in a layer where the internal electrode layer 12 extends to the edge face of the end margin 15. Each of the dielectric layers 11 of the capacity section 14 is continuously formed with each of the dielectric layers 11 of the end margin 15. With the structure, a level difference between the capacity section 14 and the end margin 15 is suppressed.

The internal electrode layers 12 are formed by firing metal conductive paste including metal powder. The dielectric layers 11 and the cover layers 13 are formed by firing dielectric green sheets including ceramic powder. However, due to a difference between materials, sintering condition differs from each other. For example, when a temperature increasing speed is small in the firing process, a continuity of the internal electrode layers 12 is reduced. And so, there is known that the continuity of the internal electrode layers 12 is improved, when the temperature increasing speed is 3000 degrees C./h or more in the firing process.

The present inventors have confirmed that the continuity of the internal electrode layers 12 is improved even if the temperature increasing speed is further increased. However, when the temperature increasing speed is excessively high (for example, 6000 degrees C./h or more), the sintering of the ceramic protection section 50 is not sufficient. When the ceramic protection section 50 is not sufficiently sintered, hardness of the surface of the multilayer ceramic capacitor 100 is not sufficiently large and a defect may occur. When a crack caused by the defect reaches the internal electrode layers 12 through the ceramic protection section 50, an electrical short may occur. However, when the temperature increasing speed is reduced or the firing temperature is increased in order to sufficiently promote the sintering of the ceramic protection section 50, the internal electrode layers 12 may be excessively sintered.

And so, it is thought that oxides of Mn (manganese), V (vanadium), Si (silicon), B (boron) or the like, or glass composition including these oxides acting as sintering assistants are added to the ceramic protection section 50 in order to promote the sintering of the ceramic protection section 50. The sintering assistant becomes a liquid phase in the sintering and contributes to densifying the surface of the main component ceramic through solving and reprecipitation. However, at the high temperature increasing speed such as 6000 degrees C./h or more, improvement effect of the densifying is limited because sufficient time for the solving and the reprecipitation is not sufficiently secured.

And so, it is thought that Zr (zirconium) promoting the sintering is added to the ceramic protection section 50. For example, it is thought that Zr of which amount is approximately the same as that of Ba is added, and the sintering characteristic is adjusted. This is because an A/B ratio which is a molar ratio of the A site and the B site is important in the perovskite sintered structure, and unchanging of the A/B ratio is important for the sintering characteristic. For example, Zr may be added in a form of $BaZrO_3$, $CaZrO_3$, $SrZrO_3$ or the like.

However, the present inventors have found that, at the high temperature increasing speed such as 6000 degrees C./h or more, the sintering may be delayed when Zr is added. This is because the grain growth of the perovskite is suppressed and the A site element existing at a grain boundary with a high concentration prevents diffusion between perovskite grains, when the A/B ratio is 1.000 or more.

And so, the present inventors have found that the ceramic protection section 50 is sufficiently sintered at the high temperature increasing speed, when the A/B ratio is largely shifted to the B-rich side and the perovskite has a Zr-rich composition.

When the amount of Zr is excessively small, the ceramic protection section 50 may not be necessarily sintered at the high temperature increasing speed. And so, the amount of Zr of the ceramic protection section 50 has a lower limit in the embodiment. In concrete, a Zr/Ti ratio which is a molar ratio of Zr and Ti in the main component ceramic of the ceramic protection section 50 is 0.010 or more. It is preferable that the Zr/Ti ratio is 0.015 or more. It is more preferable that the Zr/Ti ratio is 0.020 or more. On the other hand, when the amount of Zr is excessively large, abnormal grain growth may occur and sufficient hardness may not be necessarily achieved on the surface of the ceramic protection section 50. And so, in the embodiment, the amount of Zr of the ceramic protection section 50 has an upper limit. In concrete, the Zr/Ti ratio is 0.25 or less. It is preferable that the Zr/Ti ratio is 0.20 or less. It is more preferable that the Zr/Ti ratio is 0.16 or less.

Next, even if a sufficient amount of Zr is added to the ceramic protection section 50, the sintering of the ceramic protection section 50 may not be necessarily promoted when the A/B ratio is large. And so, in the embodiment, the A/B ratio has an upper limit. In concrete, the A/B ratio of the main component ceramic of the ceramic protection section 50 is 0.990 or less. "A" of the A/B ratio is a total molar amount of elements which can be solid-solved in the A site. For example, "A" means a total amount of Ba, and elements which can be solid-solved in the A site such as Ca, Sr or rare earth elements, when the ceramic protection section 50 includes a ceramic material which has a perovskite structure expressed as a general formula $ABO_3$, includes at least Ba in the A site, and includes Ti and Zr in the B site. "B" of the A/B ratio is a total molar amount of elements which can be solid-solved in the B site. For example, "B" means a total amount of Ti and Zr. It is preferable that the A/B ratio is 0.985 or less. It is more preferable that the A/B ratio is 0.982 or less. On the other hand, when the A/B ratio is excessively small, abnormal appearance or insufficient densification caused by local abnormal grain growth may occur or a large size pore may occur. And so, it is preferable that the A/B ratio has a lower limit. For example, it is preferable that the A/B ratio is 0.900 or more. It is more preferable that the A/B ratio is 0.920 or more. It is still more preferable that the A/B ratio is 0.940 or more.

Figure 5:
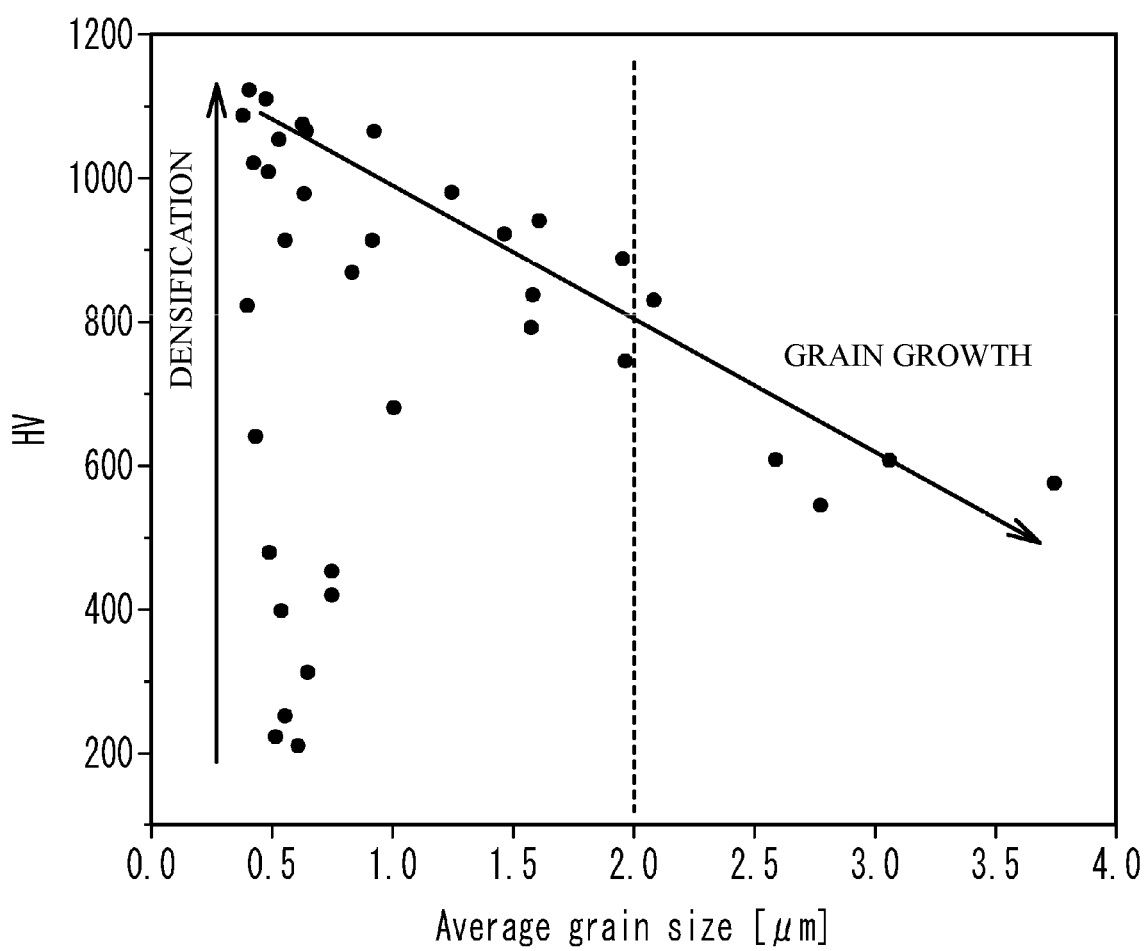
FIG. 5 illustrates a relationship between a crystal grain diameter on a surface of a ceramic protection section and Vickers hardness HV of the surface.

FIG. 5 illustrates a relationship between a crystal grain diameter on the surface of the ceramic protection section 50 after firing and Vickers hardness HV of the surface, in a case where the ceramic protection section 50 is fired by using ceramic powder of which an average particle diameter is approximately 0.5 μm. As illustrated in FIG. 5, the Vickers hardness HV becomes larger as densifying of the ceramic protection section 50 is promoted. However, when the sintering is further continued and the crystal grain diameter becomes larger because of the grain growth, the Vickers hardness HV gets lower. It is preferable that the Vickers hardness HV of the surface of the ceramic protection section 50 is 600 or more. And so, it is preferable that the average crystal grain diameter of the surface of the ceramic protection section 50 has an upper limit. In FIG. 5, there is a case where even if the average crystal grain diameter is approximately 3 μm, HV≥600 is satisfied. However, it is preferable that the average crystal grain diameter of the surface of the ceramic protection section 50 is 2.0 μm or less, from a viewpoint of distribution of the crystal grain diameter or contamination of abnormally grown crystal grains. It is more preferable that the average crystal grain diameter is 1.5 μm or less. It is still more preferable that the average crystal grain diameter is 1.2 μm or less. The average crystal grain diameter can be calculated as an average value of maximum diameters of grains in a direction in parallel with the internal electrode layers in one field of view in a SEM (Scanning Electron Microscope) image obtained with a magnification so that 100 or more of crystal grains are included in the one field of view.

It is preferable that the main component ceramic of a section (at least one of the capacity section 14 and the end margin 15) other than the ceramic protection section 50 has the same composition as that of the ceramic protection section 50. In this case, even if a large size product is fired at a rapid temperature increasing speed, inner distortion caused by a difference between internal sintering and external sintering is suppressed. The product is suitable for usage, in which resistance to mechanical stress is requested, such as automobile usage.

Figure 6:
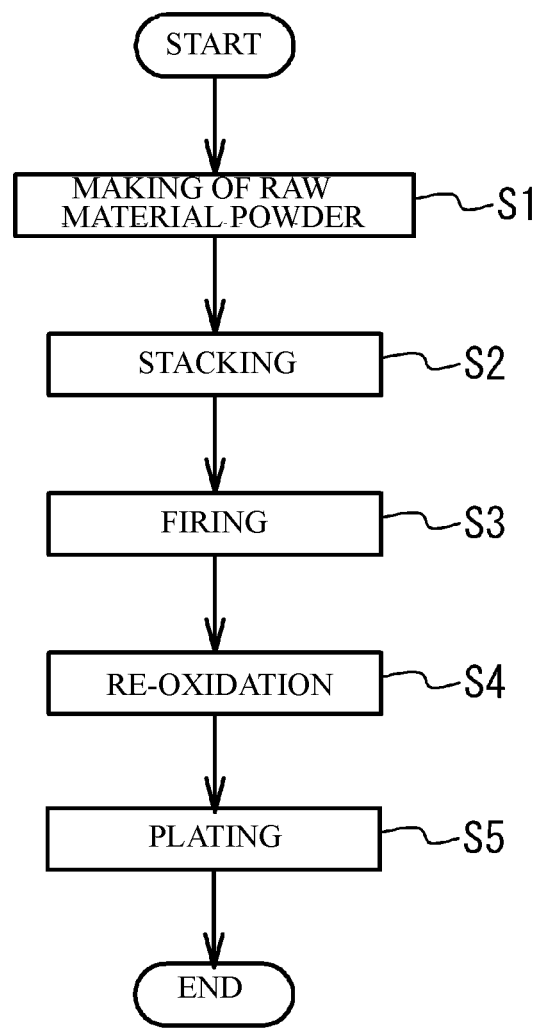
FIG. 6 illustrates a flowchart of a manufacturing method of a multilayer ceramic capacitor.

Next, a description will be given of a manufacturing method of the multilayer ceramic capacitor 100. FIG. 6 illustrates a manufacturing method of the multilayer ceramic capacitor 100.

(Making process of raw material powder) A dielectric material for forming the dielectric layers 11 is prepared. The dielectric material includes a main component ceramic of the dielectric layers 11. Generally, the A site element and the B site element are included in the dielectric layers 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layers 11. For example, a solid-phase method, a sol-gel method, a hydrothermal method or the like can be used. The embodiment may use any of these methods.

Additive compound may be added to the obtained ceramic powder, in accordance with purposes. The additive compound may be an oxide of Zr, Ca, Sr, Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium), or an oxide of Co (cobalt), Ni, Li (lithium), B, Na (sodium), K (potassium) and Si, or glass.

Next, a reverse pattern material for forming the end margins 15 and the side margins 16 is prepared. The reverse pattern material includes a main component ceramic of the end margin 15 and the side margin 16. For example, $BaTiO_3$ powder is made as the main component ceramic. It is possible to make the $BaTiO_3$ powder by the same method as that of the dielectric material. An additive compound may be added to the resulting $BaTiO_3$ powder, in accordance with purposes. The additive compound may be an oxide of Zr, Ca, Sr, Mg, Mn, V, Cr or a rare earth element (Y, Sm, Eu, Gd, Tb, Dy, Ho, Er, Tm and Yb), or an oxide of Co, Ni, Li, B, Na, K and Si, or glass. The dielectric material may be used as the reverse pattern material.

Next, a cover material for forming the cover layer 13 is prepared. The cover material includes a main component ceramic of the cover layer 13. For example, $BaTiO_3$ powder is made as the main component ceramic. It is possible to make the $BaTiO_3$ powder by the same method as that of the dielectric material. An additive compound may be added to the resulting $BaTiO_3$ powder, in accordance with purposes. The additive compound may be an oxide of Zr, Ca, Sr, Mg, Mn, V, Cr or a rare earth element (Y, Sm, Eu, Gd, Tb, Dy, Ho, Er, Tm and Yb), or an oxide of Co, Ni, Li, B, Na, K and Si, or glass. The dielectric material may be used as the cover material.

(Stacking process) Next, a binder such as polyvinyl butyral (PVB) resin, an organic solvent such as ethanol or toluene, and a plasticizer are added to the resulting dielectric material and wet-blended. With use of the resulting slurry, a base material is coated with a strip-shaped dielectric green sheet 51 with a thickness of 0.8 µm or less by, for example, a die coater method or a doctor blade method, and then dried.

Figure 7A:
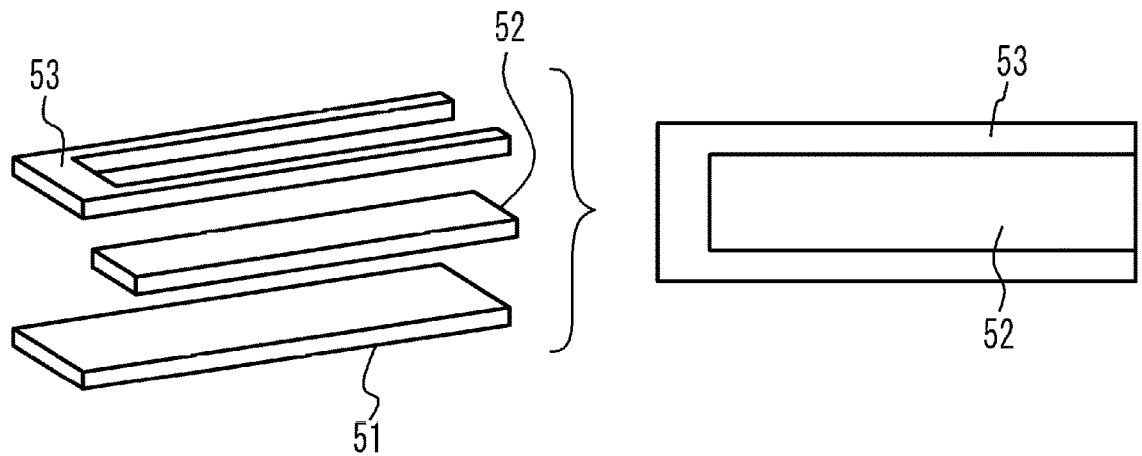
FIG. 7A and FIG. 7B illustrate a stacking process.

Next, as illustrated in FIG. 7A, metal conductive paste for forming an internal electrode is provided on the surface of the dielectric green sheet 51 by screen printing or gravure printing. The metal conductive paste includes an organic binder. Thus, a first pattern 52 for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Next, a binder and an organic solvent are added to the reverse pattern material which is made in the raw material powder making process. The binder is such as ethyl cellulose. The organic solvent is such as terpineol. And the reverse pattern material is kneaded with the binder and the organic solvent. Thus, reverse pattern paste for forming the reverse pattern layer is obtained. As illustrated in FIG. 7A, the reverse pattern paste is printed on a circumference area of the dielectric green sheet 51. The circumference area is a part of the dielectric green sheet 51 where the first pattern 52 is not printed. Thus, a second pattern 53 is provided. Therefore, a level difference caused by the first pattern 52 is buried.

Figure 7B:
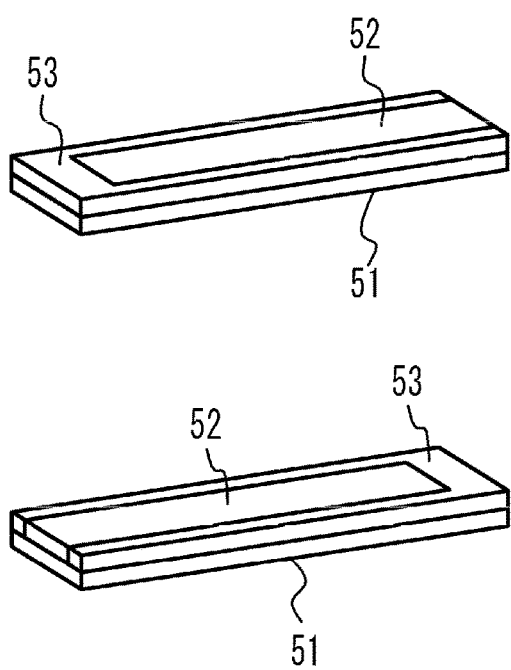

Then, as illustrated in FIG. 7B, each of the dielectric green sheets 51, each of the first patterns 52, and each of the second patterns 53 are alternately stacked so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of external electrodes 20a and 20b of different polarizations. For example a total number of the stacked dielectric green sheets 51 is 100 to 500.

Figure 8:
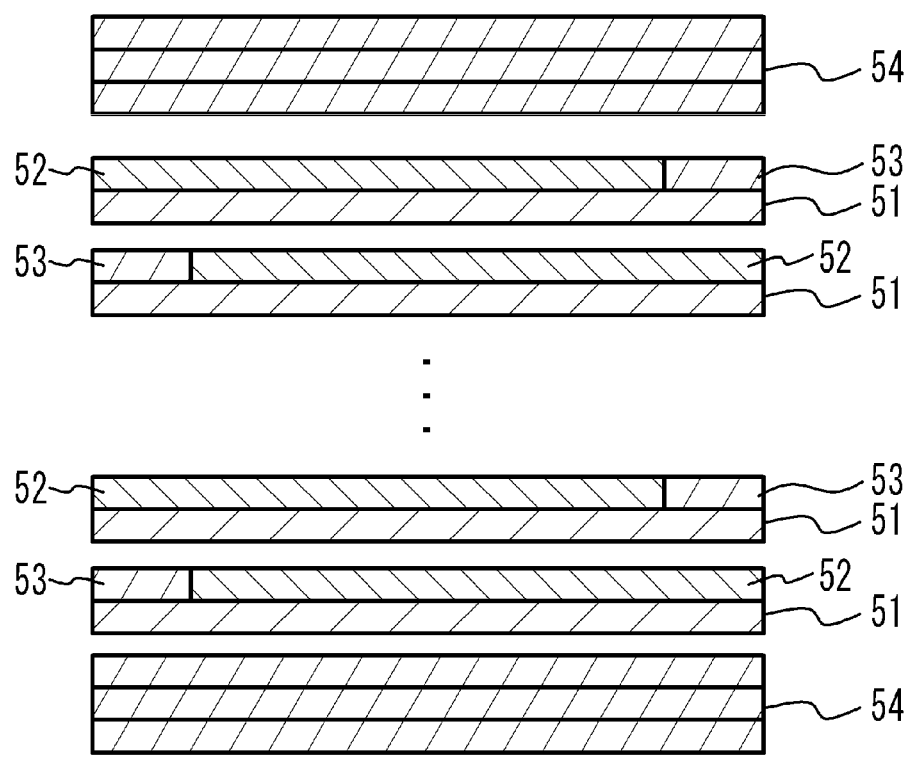
FIG. 8 illustrates a stacking process.

Next, a binder such as polyvinyl butyral (PVB) resin, an organic solvent such as ethanol or toluene, and a plasticizer are added to the cover material made in the raw material making process and wet-blended. With use of the resulting slurry, a base material is coated with a strip-shaped cover sheet 54 with a thickness of 10 µm or less by, for example, a die coater method or a doctor blade method, and then dried. As illustrated in FIG. 8, a predetermined number of the cover sheets 54 (for example, 2 to 10 layers) are stacked on an upper face of the stacked dielectric green sheets 51 and clamped. Another predetermined number of the cover sheets 54 (for example, 2 to 10 layers are stacked on an lower face of the stacked dielectric green sheets 51 and clamped. The resulting stacked structure is stamped into a predetermined size (for example, 1.0 mm×0.5 mm). After that, metal conductive paste to be the external electrodes 20a and 20b is applied to both edge faces of the cut stacked structure by dipping or the like and is dried. Thus, a ceramic multilayer structure is obtained. A predetermined number of stacked cover sheets 54 may be provided on an upper face and a lower face of the stacked dielectric green sheets 51.

In the methods of FIG. 7A to FIG. 8, a section in which a part of the dielectric green sheet 51 corresponding to the first pattern 52 and the first pattern 52 are stacked acts as a multilayer portion in which each of a plurality of sheets including $BaTiO_3$ particles of which a main component is ceramic and each of plurality of metal conductive paste patterns are alternately stacked. A section in which the rest of the dielectric green sheet 51 projecting outside of the first pattern 52 and the second pattern 53 are stacked acts as a side margin section provided on a side face of the multilayer portion.

Figure 9:
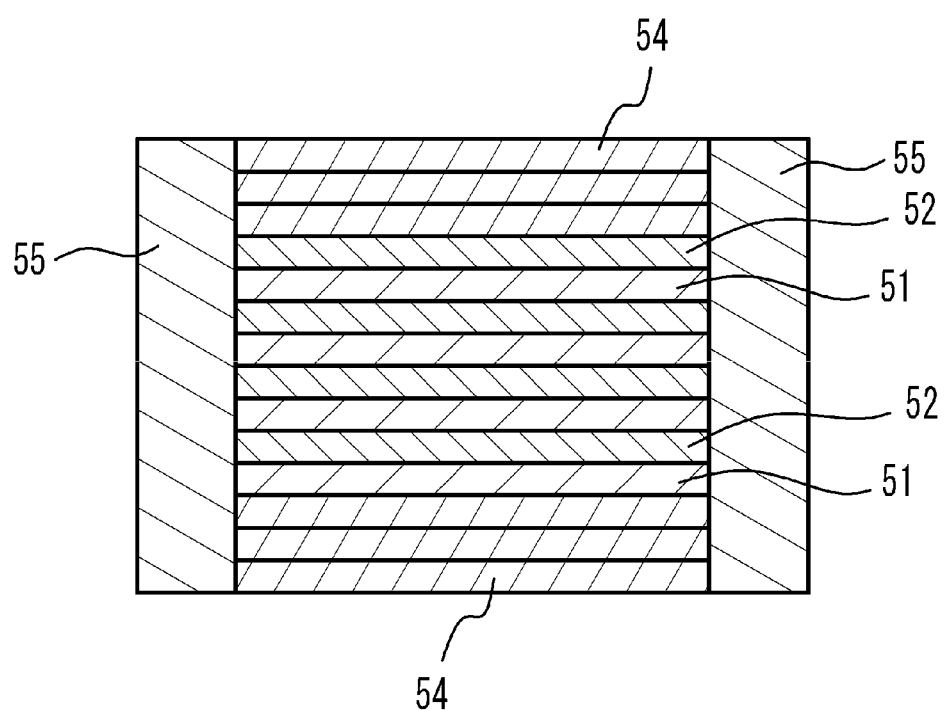
FIG. 9 illustrates a stacking process.

The side margin section may be attached to the side face of the multilayer portion or may be applied to the side face of the multilayer portion. In concrete, as illustrated in FIG. 9, the dielectric green sheet 51 and the first pattern 52 having the same width as that of the dielectric green sheet 51 are alternately stacked. Thus, the multilayer portion is formed. Next, a sheet 55 formed of the reverse pattern paste is attached to the side face of the multilayer portion. Alternatively, the side margin section may be formed by applying the reverse pattern paste on the side face.

In the methods of FIG. 7A to FIG. 9, added amounts of additives in the raw material making process are adjusted so that the Zr/Ti ratio is 0.02 or more and 0.16 or less and the A/B ratio is 0.982 or less in a section corresponding to the ceramic protection section 50.

(Firing Process) The binder is removed in $N_2$ atmosphere. After that, Ni paste to be ground layers of the external electrodes 20a and 20b is applied to the resulting ceramic multilayer structure. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. In this manner, the multilayer ceramic capacitor 100 is obtained.

(Re-Oxidation Process) After that, the re-oxidation process is performed in $N_2$ gas atmosphere in a temperature range of 600 degrees C. to 1000 degrees C.

(Plating Process) After that, with an electrolytic plating or the like, the external electrodes 20a and 20b are coated with a metal such as Cu, Ni, and Sn.

With the manufacturing method, the Zr/Ti ratio of the section corresponding to the ceramic protections section 50 is 0.010 or more. Therefore, the ceramic protection section 50 is sufficiently sintered. On the other hand, the Zr/Ti ratio is 0.25 or less, the abnormal grain growth is suppressed and sufficient hardness is achieved on the surface of the ceramic protection section 50. And, the A/B ratio of the section corresponding to the ceramic protection section 50 is 0.990 or less. Therefore, the A/B ratio is sufficiently small. And, the ceramic protection section 50 is sufficiently sintered.

It is preferable that the Zr/Ti ratio is 0.015 or more. It is more preferable that the Zr/Ti ratio is 0.020 or more. It is preferable that the Zr/Ti ratio is 0.20 or less. It is more preferable that the Zr/Ti ratio is 0.16 or less. It is preferable that the A/B ratio is 0.985 or less. It is more preferable that the A/B ratio is 0.982 or less. It is preferable that the A/B ratio is 0.920 or more. It is more preferable that the A/B ratio is 0.940 or more. It is preferable that the firing condition such as the firing temperature or the firing period is adjusted so that the average crystal grain diameter on the surface of the ceramic protection section 50 after the firing is 2.0 μm or less. It is more preferable that the firing condition is adjusted so that the average crystal grain diameter is 1.5 μm or less. It is still more preferable that the firing condition is adjusted so that the average crystal grain diameter is 1.2 μm or less.

As described above with use of FIG. 5, the Vickers hardness HV becomes lower as the grain growth is promoted. It is therefore preferable that the grain growth has an upper limit. For example, it is preferable that the firing condition is adjusted so that the average crystal grain diameter of the surface of the ceramic protection section 50 after the firing is 10 times or less as the average particle diameter of the main component ceramic powder in the section corresponding to the ceramic protection section 50 in the ceramic multilayer structure before the firing. It is more preferable that the firing condition is adjusted so that the average crystal grain diameter of the surface of the ceramic protection section 50 after the firing is 4 times or less as the average particle diameter of the main component ceramic powder in the section corresponding to the ceramic protection section 50 in the ceramic multilayer structure before the firing. It is still more preferable that the firing condition is adjusted so that the average crystal grain diameter of the surface of the ceramic protection section 50 after the firing is 2.5 times or less as the average particle diameter of the main component ceramic powder in the section corresponding to the ceramic protection section 50 in the ceramic multilayer structure before the firing.

It is preferable that a maximum value of the temperature increasing speed in the firing process is more than 3000 degrees C./h from a viewpoint of improving the continuous modulus of the internal electrode layers 12. It is more preferable that the maximum value is 6000 degrees C./h or more. It is still more preferable that the maximum value is 9000 degrees C./h or more.

It is preferable that the firing temperature (a maximum temperature of the firing process) is 860 degrees C. or more. It is more preferable that the firing temperature is 1000 degrees C. or more. It is still more preferable that the firing temperature is 1100 degrees C. or more. This is because the densifying is promoted when the firing temperature is increased. It is preferable that the firing temperature is 1250 degrees C. or less. It is more preferable that the firing temperature is 1200 degrees C. or less. It is still more preferable that the firing temperature is 1150 degrees C. or less. This is because heat energy applied to the internal electrode layers 12 is small when the firing temperature is low, and breaking of the internal electrode layers 12 is suppressed.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Examples

Example 1

Additive compound was added to barium titanate powder. The barium titanate powder and the additive compound were wet-blended with each other in a ball mil and were crushed. Thus, a dielectric material was obtained. Additive compound was added to barium titanate powder. The barium titanate powder and the additive compound were wet-blended with each other in a ball mil and were crushed. Thus, a reverse pattern material was obtained. Additive compound was added to barium titanate powder. The barium titanate powder and the additive compound were wet-blended with each other in a ball mil and were crushed. Thus, a cover material was obtained.

As an organic binder, a butyral-based material was added to the dielectric material. As a solvent, toluene and ethyl alcohol were added to the dielectric material. The dielectric green sheet 51 was made by a doctor blade method. As the first pattern 52, metal conductive paste was printed on the resulting dielectric green sheet 51. A binder such as ethyl cellulose and an organic solvent such as terpineol were added to the reverse pattern material. And the reverse pattern material was kneaded with the binder and the organic solvent by a roll mill. Thus, reverse pattern paste was made. As the second pattern 53, the resulting reverse pattern paste was printed on a part of the dielectric green sheet 51 where the first pattern 52 was not printed. 250 numbers of the dielectric green sheets 51 on which the first pattern 52 and the second pattern 53 were printed were stacked.

As an organic binder, a butyral-based material was added to the cover material. As a solvent, toluene and ethyl alcohol were added to the cover material. The cover sheet was made by a doctor blade method. The cover sheet was stacked on an upper face and a lower face of the stacked dielectric green sheets and was thermally clamped. The thickness of the cover sheet was 30 μm.

The Zr/Ti ratio was 0.020 and the A/B ratio was 0.960, in the section corresponding to the ceramic protection section 50.

After that, the binders were removed in $N_2$ atmosphere. Ni external electrodes were formed on the resulting multilayer structure by a dipping. The resulting multilayer structure was fired in a reductive atmosphere ($O_2$ partial pressure: $10^{-5}$ to $10^{-8}$ atm). Thus a sintered structure was formed. The sintered structure had a length of 1.0 mm, a width of 0.5 mm and a height of 0.5 mm. The sintered structure was subjected to a re-oxidation process at 800 degrees C. in $N_2$ atmosphere. After that, metal layers of Cu, Ni and Sn were plated on the surface of the external electrodes by plating. Thus, the multilayer ceramic capacitor 100 was formed. After the firing, the thickness of each of the dielectric layers 11 was 2.5 μm. The thickness of each of the internal electrode layers 12 was 2.0 μm.

Example 2

In an example 2, the Zr/Ti ratio was 0.040 in a section corresponding to the ceramic protection section 50. Other conditions were the same as those of the example 1.

Example 3

In an example 3, the Zr/Ti ratio was 0.080 in a section corresponding to the ceramic protection section 50. Other conditions were the same as those of the example 1.

Example 4

In an example 4, the Zr/Ti ratio was 0.16 in a section corresponding to the ceramic protection section 50. Other conditions were the same as those of the example 1.

Comparative Example 1

In a comparative example 1, the Zr/Ti ratio was 0.0020 in a section corresponding to the ceramic protection section 50. Other conditions were the same as those of the example 1.

Comparative Example 2

In a comparative example 2, the Zr/Ti ratio was 0.32 in a section corresponding to the ceramic protection section 50. Other conditions were the same as those of the example 1.

Figure 10A:
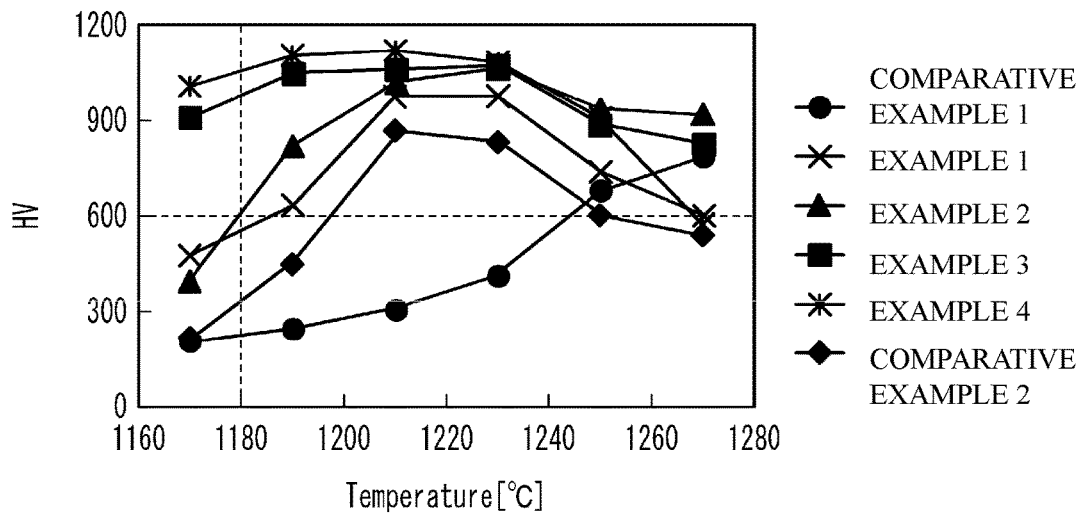
FIG. 10A illustrates Vickers hardness HV of a surface of a ceramic protection section of each of examples 1 to 4 and comparative examples 1 and 2.
Figure 10B:
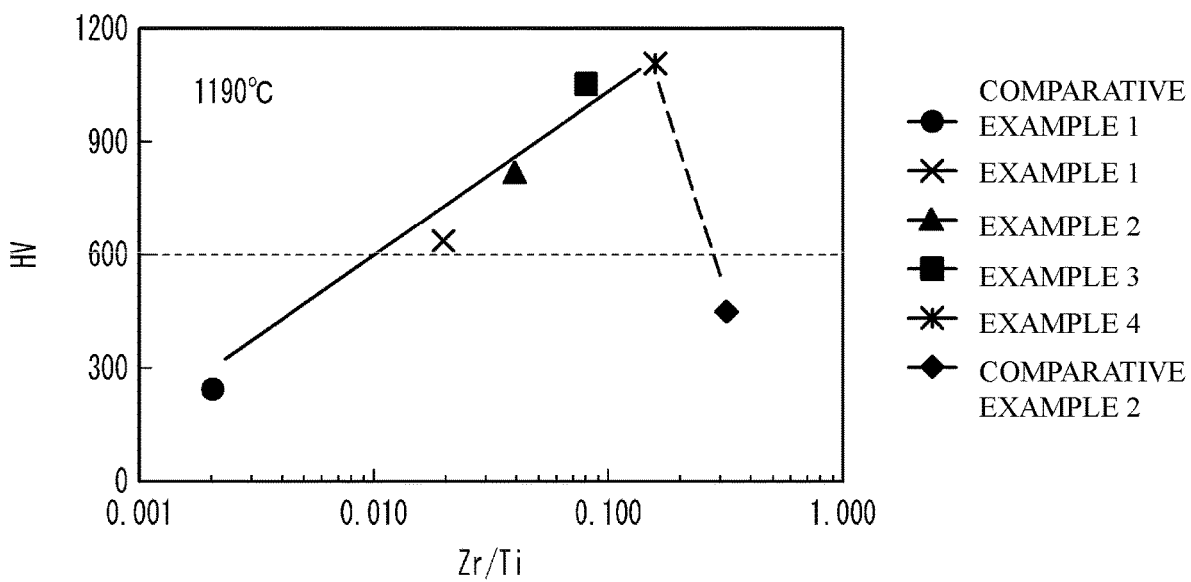
FIG. 10B illustrates Vickers hardness HV of a surface of a ceramic protection section of in a case where a firing temperature is 1190 degrees C.

FIG. 10A illustrates Vickers hardness HV of the surface of the ceramic protection section 50 in each case where the firing temperature was 1170 degrees C., 1190 degrees C., 1210 degrees C., 1230 degrees C., 1250 degrees C. and 1270 degrees C., with respect to the examples 1 to 4 and the comparative examples 1 and 2. FIG. 10B illustrates Vickers hardness HV of the surface of the ceramic protection section 50 of each of the examples 1 to 4 and the comparative examples 1 and 2 in the case where the firing temperature was 1190 degrees C. The Vickers hardness HV was a value which was measured under a condition that the load of a Vickers hardness testing machine was 100 gf and a holding time of the load was 15 seconds.

As illustrated in FIG. 10A and FIG. 10B, the Vickers hardness HV was sufficiently high in the examples 1 to 4. In particular, the Vickers hardness HV was 600 or more and sufficiently high, at a temperature which was larger than 1180 degrees C. at which the internal electrode layer 12 was sufficiently densified. It is thought that this was because the Zr/Ti ratio in the section corresponding to the ceramic protection section 50 was 0.010 or more and 0.25 or less, the A/B ratio in the section corresponding to the ceramic protection section 50 was 0.990 or less, the abnormal grain growth was suppressed, and the sintering of the ceramic protection section 50 was sufficiently promoted.

On the other hand, the Vickers hardness HV was low in the comparative example 1. It is thought that this was because the Zr/Ti ratio was less than 0.010, and the sintering of the ceramic protection section 50 was not sufficiently promoted. In the comparative example 2, the Vickers hardness was high at temperatures of 1210 degrees C. and 1230 degrees C. However, in the comparative example 2, the Vickers hardness was not sufficiently high at temperatures of 1250 degrees C. and 1270 degrees C. It is though that the Zr/Ti ratio was more than 0.25, and the abnormal grain growth occurred.

Example 5

In an example 5, the A/B ratio was 0.922 in a section corresponding to the ceramic protection section 50. Other conditions were the same as those of the example 3.

Example 6

In an example 6, the A/B ratio was 0.942 in a section corresponding to the ceramic protection section 50. Other conditions were the same as those of the example 3.

Example 7

In an example 7, the A/B ratio was 0.982 in a section corresponding to the ceramic protection section 50. Other conditions were the same as those of the example 3.

Comparative Example 3

In a comparative example 3, the A/B ratio was 1.002 in a section corresponding to the ceramic protection section 50. Other conditions were the same as those of the example 3.

Figure 11:
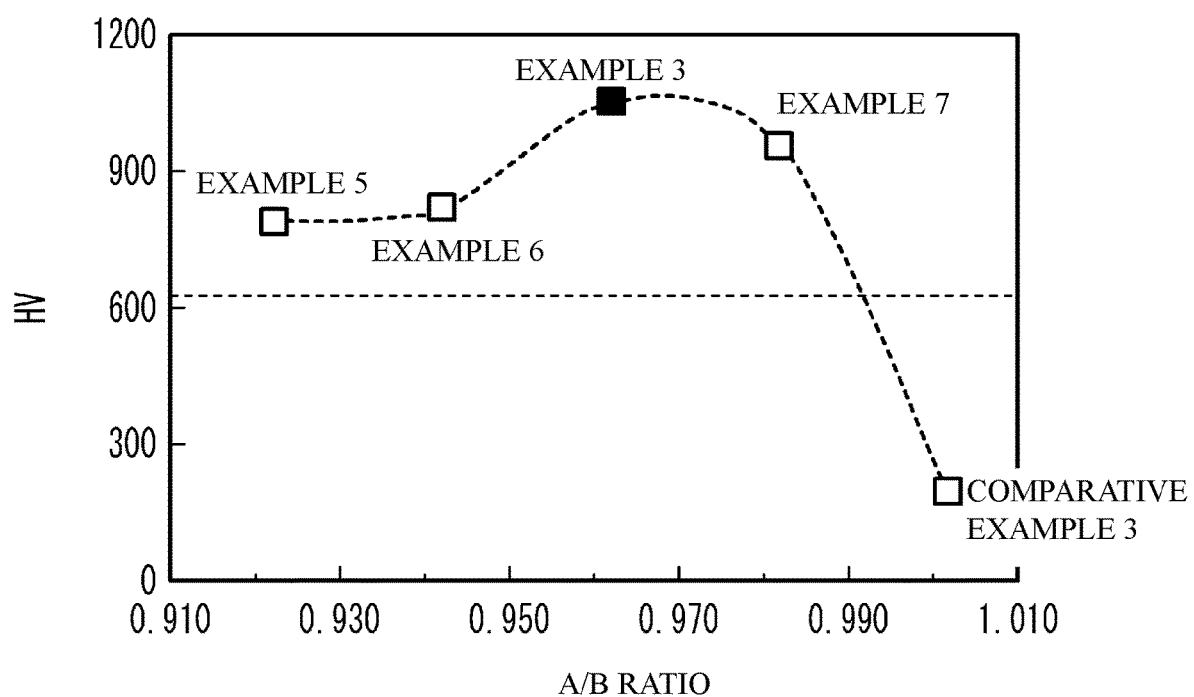
FIG. 11 illustrates Vickers hardness HV of a surface of a ceramic protection section of each of examples 3 and 5 to 7 and a comparative example 3.

FIG. 11 illustrates Vickers hardness HV of the surface of the ceramic protection section 50 of each of the examples 3, and 5 to 7 and the comparative example 3 in the case where the firing temperature was 1190 degrees C. The Vickers hardness HV was a value which was measured under a condition that the load of a Vickers hardness testing machine was 100 gf and a holding time of the load was 15 seconds. As illustrated in FIG. 11, the Vickers hardness HV was more than 600 and was sufficiently high in the examples 3 and 5 to 7. It is thought that this was because the Zr/Ti ratio in the section corresponding to the ceramic protection section 50 was 0.010 or more and 0.25 or less, the A/B ratio in the section corresponding to the ceramic protection section 50 was 0.990 or less, the abnormal grain growth was suppressed, and the sintering of the ceramic protection section 50 was sufficiently promoted.

On the other hand, in the comparative example 3, the Vickers hardness was low. It is thought that this was because the A/B ratio was large, and the sintering of the ceramic protection section 50 was not sufficiently promoted.

Although the embodiments of the present invention have been described in detail, it is to be understood that the various change, substitutions, and alterations could be made hereto without departing from the spirit and scope of the invention. It is possible to confirm an amount of each element of the dielectric layers 11 by performing ICP analysis or La-ICP-MS (Laser Ablation Inductively Coupled Plasma Mass Spectrometry). And it has been confirmed that the amount of each element of a product measured by the analysis coincide with an amount of each element added as a raw material.

What is claimed is:

1. A ceramic electronic device comprising:
a multilayer structure in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first end face and a second end face of the multilayer structure, the first end face facing with the second end face,
wherein a ceramic protection section includes a cover layer and a side margin,
wherein the cover layer is provided on at least one of an upper face and a lower face in a stacking direction of the multilayer structure,
wherein, in the multilayer structure, the side margin is a section covering edge portions to which the plurality of internal electrode layers extend toward two side faces other than the first end face and the second end face,
wherein a main component ceramic of the ceramic protection section is a ceramic material having a perovskite structure expressed as a general formula $ABO_3$,
wherein an A site of the perovskite structure includes at least Ba,
wherein a B site of the perovskite structure includes at least Ti and Zr,
wherein a Zr/Ti ratio which is a molar ratio of Zr and Ti is 0.020, 0.040, 0.080 or 0.16,
wherein an A/B ratio which is a molar ratio of the A site and the B site is 0.922 or more and 0.982 or less.

2. The ceramic electronic device as claimed in claim 1, wherein Vickers hardness HV of a surface of the ceramic protection section is 600 or more.

3. The ceramic electronic device as claimed in claim 1, wherein an average crystal grain diameter of a surface of the ceramic protection section is 2.0 μm or less.

4. The ceramic electronic device as claimed in claim 1, wherein a main component of the internal electrode layers is Ni or Cu.

5. The ceramic electronic device as claimed in claim 1, wherein a main component ceramic of a capacity section is the same as that of the ceramic protection section,
wherein the capacity section is a section in which a set of internal electrode layers exposed to the first edge face of the multilayer structure face with another set of internal electrode layers exposed to the second edge face of the multilayer structure.

6. The ceramic electronic device as claimed in claim 1, wherein the Zr/Ti ratio which is a molar ratio of Zr and Ti is 0.16.

7. The ceramic electronic device as claimed in claim 1, wherein the A/B ratio is 0.922, 0.942, 0.960 or 0.982.

8. The ceramic electronic device as claimed in claim 1, wherein Vickers hardness HV of a surface of the ceramic protection section is 600 or more; and wherein an average crystal grain diameter of a surface of the ceramic protection section is 2.0 μm or less.

9. The ceramic electronic device as claimed in claim 1, wherein Vickers hardness HV of a surface of the ceramic protection section is 600 or more; and wherein an average crystal grain diameter of a surface of the ceramic protection section is 3.0 μm or less.

10. A ceramic electronic device comprising:
a multilayer structure in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first end face and a second end face of the multilayer structure, the first end face facing with the second end face,
wherein a ceramic protection section includes a cover layer and a side margin,
wherein the cover layer is provided on at least one of an upper face and a lower face in a stacking direction of the multilayer structure,
wherein, in the multilayer structure, the side margin is a section covering edge portions to which the plurality of internal electrode layers extend toward two side faces other than the first end face and the second end face,
wherein a main component ceramic of the ceramic protection section is a ceramic material having a perovskite structure expressed as a general formula $ABO_3$,
wherein an A site of the perovskite structure includes at least Ba,
wherein a B site of the perovskite structure includes at least Ti and Zr,
wherein a Zr/Ti ratio which is a molar ratio of Zr and Ti is 0.04 or more and 0.16 or less,
wherein an A/B ratio which is a molar ratio of the A site and the B site is 0.922, 0.942, 0.960 or 0.982.

* * * * *